(12) United States Patent
Dent et al.

(10) Patent No.: US 9,164,649 B2
(45) Date of Patent: Oct. 20, 2015

(54) PRESENTING CONTEXT INFORMATION IN A COMPUTING DEVICE

(71) Applicant: RESEARCH IN MOTION LIMITED, Waterloo (CA)

(72) Inventors: Terrill Mark Dent, Waterloo (CA); Ryan Gregory Wood, Richmond (CA); Kalu Onuka Kalu, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 348 days.

(21) Appl. No.: 13/708,168

(22) Filed: Dec. 7, 2012

(65) Prior Publication Data

US 2013/0151989 A1 Jun. 13, 2013
US 2013/0318449 A2 Nov. 28, 2013

Related U.S. Application Data

(60) Provisional application No. 61/568,143, filed on Dec. 7, 2011.

(51) Int. Cl.
G06F 3/048 (2013.01)
G06F 3/0481 (2013.01)
G06F 17/30 (2006.01)

(52) U.S. Cl.
CPC ........ G06F 3/0481 (2013.01); G06F 17/30286 (2013.01)

(58) Field of Classification Search
CPC .................................................. G06F 3/0481
USPC .......................... 715/780, 803, 740, 761, 779
See application file for complete search history.

(56) References Cited

U.S. PATENT DOCUMENTS

| 5,987,495 | A | 11/1999 | Ault et al. |
| 6,710,790 | B1 | 3/2004 | Fagioli |
| 6,954,355 | B2 | 10/2005 | Gerstner et al. |
| 7,783,702 | B2 | 8/2010 | Liu et al. |
| 2002/0008693 | A1 | 1/2002 | Banerjee et al. |
| 2005/0289096 | A1 | 12/2005 | Trossen et al. |

(Continued)

FOREIGN PATENT DOCUMENTS

| WO | 2006049506 A1 | 5/2006 |
| WO | 2007068082 A1 | 6/2007 |

OTHER PUBLICATIONS

Extended European Search report mailed Apr. 3, 2013, in corresponding European patent application No. 12196149.4.

(Continued)

*Primary Examiner* — Haoshian Shih
(74) *Attorney, Agent, or Firm* — Fish & Richardson P.C.

(57) ABSTRACT

An electronic computing device can be configured to act as a text-entry device and a cursor control device for a second device. The first device can include a touch-sensitive display capable of receiving text inputs and cursor inputs for controlling operations performed on the second device which is communicatively coupled to the first device. The first device can be configured such that selection of a field displayed by the second device can cause information such as text from a focus field to be displayed by the first device. The second device can be configured to send information pertaining to the focus field to the first device. The information can include a warning that the maximum length of input for the focus field has been, or is about to be, exceeded.

20 Claims, 8 Drawing Sheets

(56) References Cited

U.S. PATENT DOCUMENTS

| | | |
|---|---|---|
| 2008/0034081 A1 | 2/2008 | Marshall et al. |
| 2008/0045247 A1* | 2/2008 | Wilson .......................... 455/466 |
| 2008/0201644 A1 | 8/2008 | Partani et al. |
| 2009/0064035 A1* | 3/2009 | Shibata et al. ................ 715/803 |
| 2013/0024783 A1* | 1/2013 | Brakensiek et al. .......... 715/753 |

OTHER PUBLICATIONS

Office Action in Canadian Application No. 2,798,291, dated Apr. 1, 2014, 2 pages.

* cited by examiner

PRESENTING CONTEXT INFORMATION IN A COMPUTING DEVICE

CROSS-REFERENCE TO RELATED APPLICATION

This application claims priority to U.S. Provisional Application No. 61/568,143, entitled, Presenting Context Information in a Computing Device, which was filed on Dec. 7, 2011 and which is fully incorporated by reference herein.

FIELD OF TECHNOLOGY

The present disclosure relates generally to electronic devices, and more particularly to a system and method of communicating operating system-initiated event information between a first electronic device and a second electronic device.

BACKGROUND

Computers can be communicatively coupled to peripheral devices such as a keyboard and a mouse. The peripheral devices can be "dumb devices" configured for one way communication from the peripheral device to the computer.

The peripheral devices can perform data entry, command entry, and cursor navigation on the computer. In this way, the peripheral device can act as a cursor navigation tool for a cursor displayed on the computer display. Also, a peripheral device can act as a text-entry device for entering text that is displayed on the computer display. What is needed is a peripheral device that performs two way communications with the computer.

BRIEF DESCRIPTION OF THE DRAWINGS

In order to describe a manner in which features of the disclosure can be obtained, reference is made to specific embodiments that are illustrated in the appended drawings. Based on an understanding that these drawings depict only example embodiments of the disclosure and are not intended to be limiting of scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without departing from the scope of the disclosure.

Several definitions that apply throughout this document will now be presented. The phrase "coupled" is defined as connected, whether directly or indirectly through intervening components and is not necessarily limited to physical connections. Coupled devices are devices which are in signal communication with one another.

The term "computing device" is defined as any device that is capable of at least accepting data, transmitting data, and executing commands. For example, computing devices can include, but are not limited to, portable communication devices, mobile communication devices, mobile computers, smart phones, computing pads, tablet computers, personal computers, desktop computers, laptop computers, netbooks, servers, routers, set-top phones, or other computing device capable of at least accepting data, transmitting data, and executing commands.

The term "user interface data" is defined as text information, cursor information, and other information that, in at least one embodiment, can correspond to a text-entry field. User interface data can be entered as input on a device, can be used to control a device, and can be displayed by a device. The term "interface" is defined as a display, display screen, or other device for receiving user interaction. The term "character" is defined as a symbol, such as a number, letter or other shape and the like. The term "touch" means the contact, such as by a finger, finger-tip, digit, or stylus and the like. A touch can include contact, such as a sweep or other gesture. The term "item" is defined as an icon, a symbol, a picture, or the like.

The technology enables two "smart devices" to perform two way communications. Communications may be initiated through proprietary connections, such as a BlackBerry® bridge or the like, while communication may be performed using a Bluetooth® connection, a Wi-Fi™ connection, or the like. In a first communication direction, a first electronic device transmits signals that are received by a second electronic device to perform data entry, command entry, and cursor navigation. In a second communication direction, the second electronic device transmits signals to the first electronic device, the signals may include operating system instructions and data for displaying GUI information obtained from the second electronic device. The GUI information originating from the second electronic device may include information such as a selected field of focus, data entered into the selected field of focus, a cursor position within the selected field of focus, a keyboard layout, or the like. In one example, the GUI information may be transmitted along with an event, such as a focus event, a numeric input field type event, a cursor position event, or the like. Data entered at the first electronic device may be mirrored on displays of the first electronic device and the second electronic device.

According to one example, the operating system instructions that originate from the second electronic device may cause a processor at the first electronic device to locally configure features for an application running on the second electronic device. For example, a keyboard configuration may be presented at the first electronic device that corresponds to a keyboard configuration for the application running on the second electronic device. If the first electronic device establishes a connection with the second electronic device, then the keyboard is enabled at the second electronic device and suppressed at the first electronic device. Additionally or alternatively, a navigation tool and a voice-command receiving tool may be presented at the first electronic device to navigate within the application running on the second electronic device. Similarly, if the first electronic device establishes a connection with the second electronic device, then the navigation tool or the voice-command receiving tool is enabled at the second electronic device and suppressed at the first electronic device.

According to one example, the first electronic device may include a smart phone device and the second electronic device may include a tablet computer. The tablet computer includes a display screen that is larger than a display screen provided with the smart phone device. Therefore, the application displayed on the GUI of the tablet computer may include a plurality of fields, while the corresponding application displayed on the GUI of the smart phone device may include a single field. As described in detail below with respect to FIG. 7, a credit card application displayed on the GUI of the tablet computer may include several fields, including a name field, a date of birth field, a login field, and a password field, or the like. By contrast, the corresponding credit card application displayed on the GUI of the smart phone device may a single field such as the password field.

According to one example, a dedicated remote control application may be launched on the smart phone device. The operating system commands received with the Bluetooth® signal may be routed to the remote control application, which performs functions such as displaying an appropriate field, customizing the keyboard to facilitate entry of data corresponding to the appropriate field, and positioning the cursor within the displayed field, or the like. The remote control application may generate signals for navigating the application running on the tablet computer. Alternatively, the remote control application may reside on one or more servers to enable server-side operation of remote control application.

Figure 1:
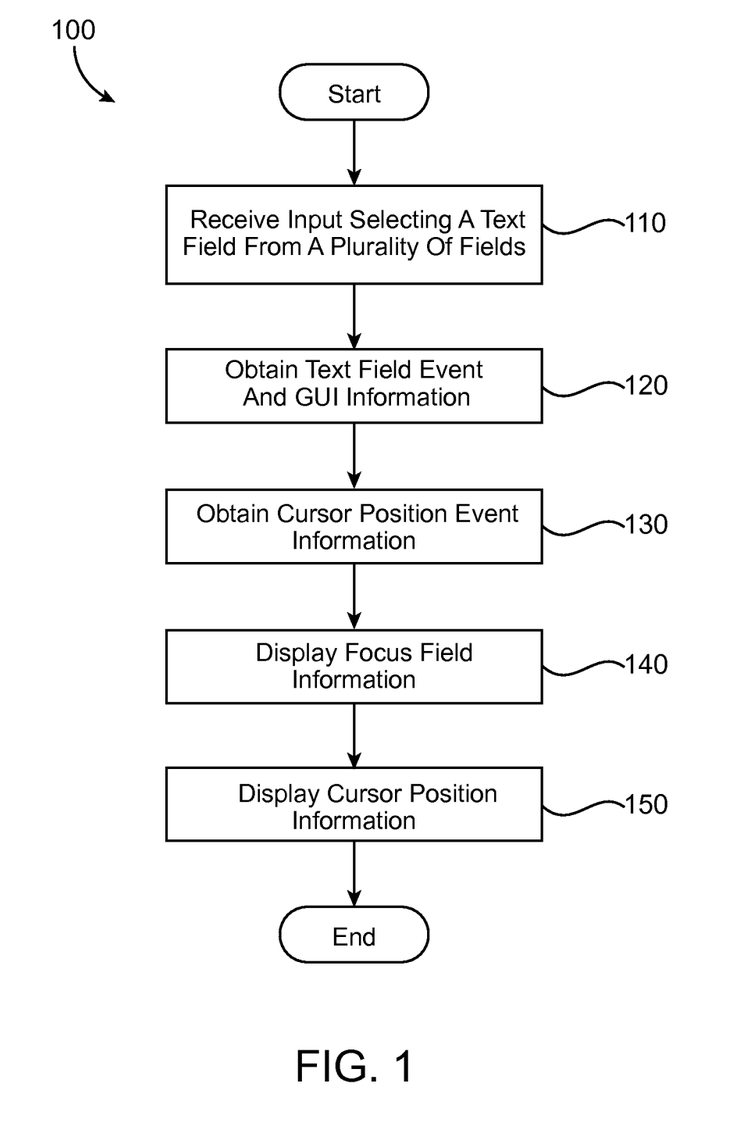
FIG. 1 is a flow chart illustrating a process of receiving and displaying user interface data on a first device in accordance with one example.

FIG. 1 is a flow chart of a method of receiving and displaying user interface data on a first device in accordance with an example embodiment. The method 100 illustrated in FIG. 1 is provided by way of example, as there are a variety of ways to carry out the method. Additionally, while the example method 100 is illustrated with a particular order of steps, those of ordinary skill in the art will appreciate that FIG. 1 and the steps illustrated therein can be executed in any order that accomplishes the technical advantages of the present disclosure and can include fewer or more steps than illustrated. Furthermore, the example method 100 can be combined with the methods shown in FIGS. 2 and 3, as will be explained below.

Each block shown in FIG. 1 represents one or more processes, methods, or subroutines, carried out in example method 100. The steps illustrated in FIG. 1 can be implemented in a system including a first computing device coupled to a second computing device. For example, each block shown in FIG. 1 can be carried out by the processor of a first computing device 430 (hereinafter "first device 430") illustrated in FIG. 4. The flow chart illustrated in FIG. 1 will be described in relation to and make reference to the first computing device 430 and a second computing device 400 (hereinafter "second device 400") illustrated in FIG. 4. In the example discussed in the next paragraph, inputs on the first device 430 can be used to at least partially control the second device 400.

In FIG. 1, a remote control application is launched to initiate method 100 at block 110. When the method 100 starts at block 110 an input can be received at the first device 430 and transmitted over a transport protocol to select among a plurality of fields displayed on the display of the second device 400. The input can be, for example, the selection of a text field displayed on the display of the second device 400. Although the discussion of the method 100 illustrated in FIG. 1 uses the example of selection of a text field as an indication of a desire to enter text, other inputs and selections are possible within this disclosure, as will be explained below. Once the input received at block 110 has been transmitted away from the first device 430 for selecting a text field on the second device 400, the operating system at the second device 400 can send a signal to the first device 430 to present an application GUI indicating that the text field has been selected, and the method can proceed to block 120.

At block 120, the first device 430 receives GUI information including text present in the text field along with one or more events, such as a focus event, a text field event, a cursor position event, and a date entry event which can be carried by a signal from the second device 400. Once GUI information and event information from the second device 400 has been received by the first device 430, the method can proceed to block 130.

At block 130, the first device 430 receives event information providing the location of a cursor present in the text field of the second device 400. The location of the cursor can be indicative of the location where text, whether added, modified, or deleted via the first device 430, will be changed in the text field on the second device 400. The first device 430 can be configured to display a keyboard with selectable characters on a touch-sensitive display upon receiving the data entry event at the first device 430. Displaying selectable characters can consist of, for example, displaying a virtual keyboard or virtual keypad or both. At block 130, the first device 430 also receives focus event and cursor position information from the second device 400. Once focus event and cursor position information has been received from the second device 400, the method can continue to block 140 in which a GUI information contained within a focus field is displayed on the first device 430, as will be explained in greater detail with respect to FIG. 4. The method can then proceed to step 150 in which information about the location of the cursor within the focus field is further displayed by the first device 430 and mirrored on the second device 400.

Figure 2:
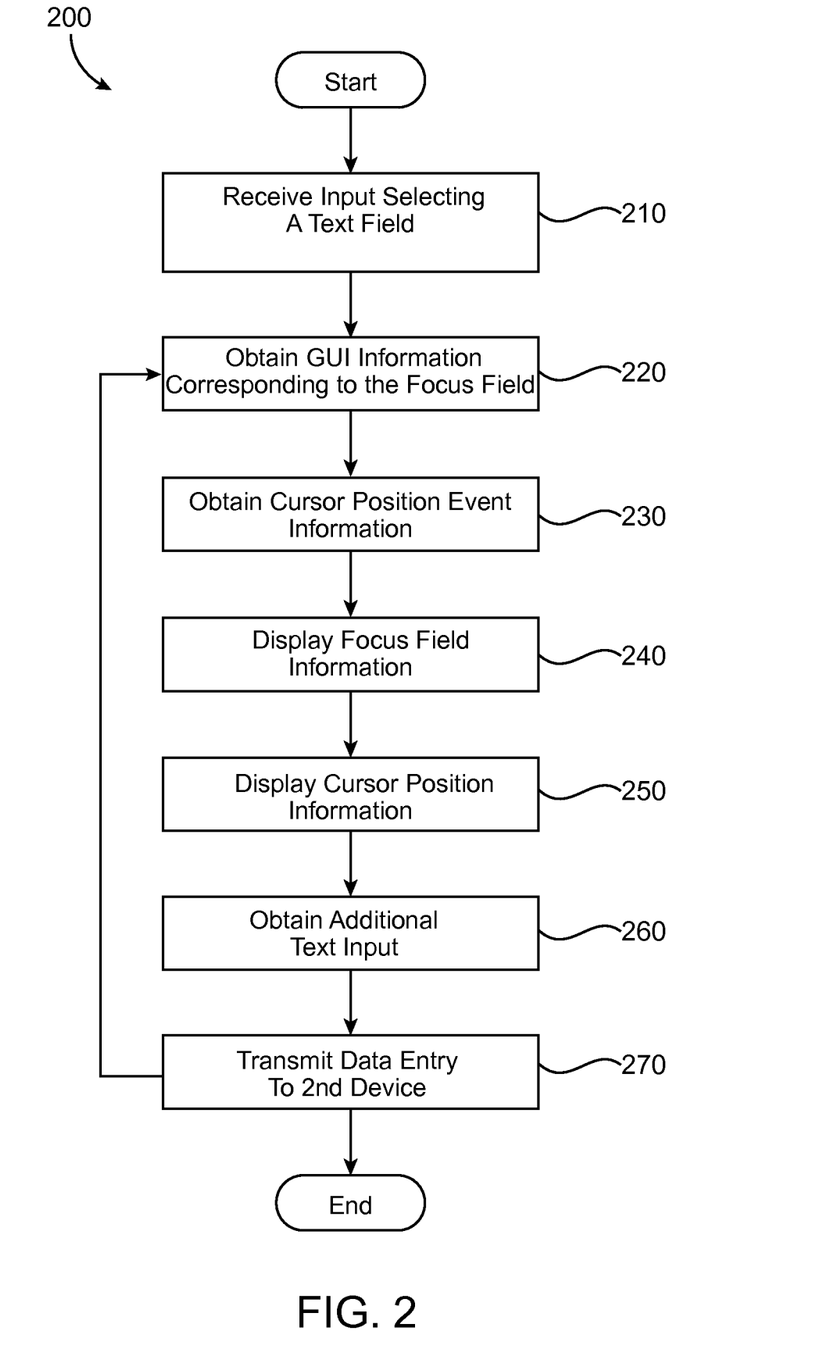
FIG. 2 is a flow chart illustrating a process of entering text on a first device for display on a second device and updating information on the first device about the displayed text in accordance with an example embodiment.

FIG. 2 is a flow chart of a method of entering text on a first device 430 for display on a second device 400 and updating information on the first device 430 about the displayed text in accordance with an example embodiment. Continuing with the example discussed with respect to FIG. 1, the method 200 pertains to a first device 430 configured to enter text corresponding to a text field of a second device 400. At block 210, the first device 430 receives input indicating selection of a text field displayed on a second device 400. The method can proceed to block 220. At block 220, the first device 430 receives GUI information, such as text information corresponding to text in a text field from a second device 400, along with event information. The method can then continue to block 230. At block 230, the first device 430 receives cursor position information about the location of a cursor present in the text field. As explained with respect to FIG. 1, the location of the cursor can be indicate the location where text, whether added, modified, or deleted via the first device 430, will be changed in the text field on the second device 400. Once text information and cursor position information has been received from the second device 400, the method can continue to block 240 in which a focus field corresponding to a relevant portion of the text information received is displayed on the first device 430. The focus field may be a portion of the GUI content, which may include a plurality of fields. Text within the selected text field may be obtained from the second device 400. The method can then proceed to step 250 in which cursor position information identifying the location of the cursor within the text field is displayed by the first device 430 along with the second device 400. Once text within the focus field and cursor information are displayed on the first device 430 as in blocks 240 and 250, the first device 430 can further receive text inputs at block 260. Once additional text inputs are received via the first device 430, the additional text inputs can be transmitted to the second device 400 at block 270.

Figure 3:
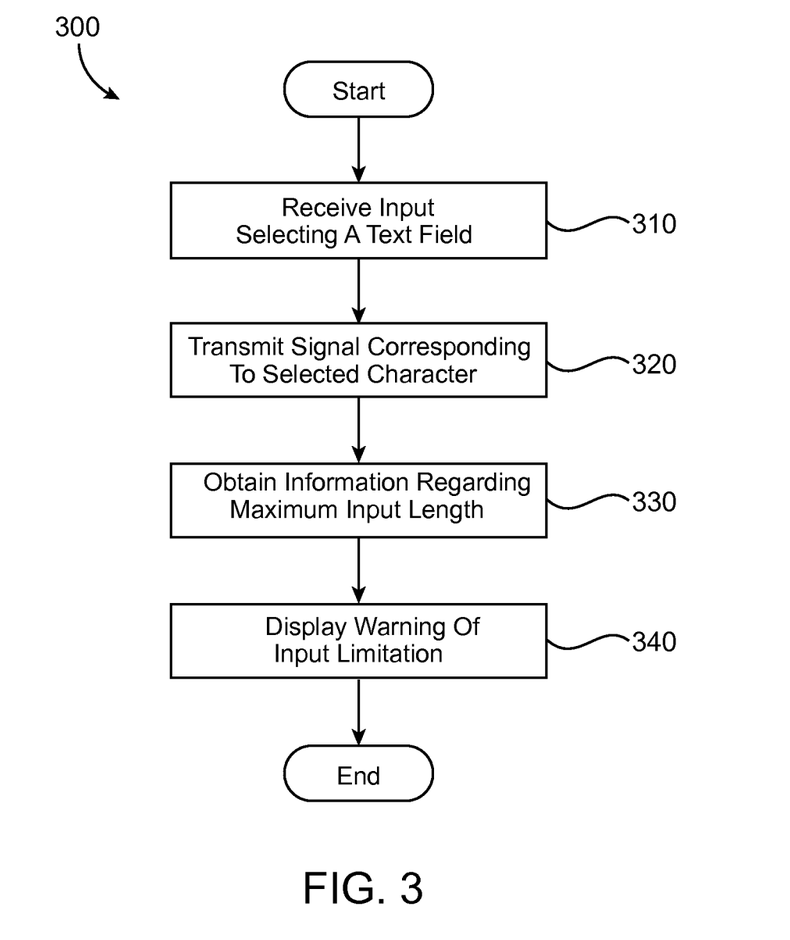
FIG. 3 is a flow chart illustrating a process of notifying a first device that a maximum input length threshold has been met on a second device in accordance with an example embodiment.

FIG. 3 is a flow chart of a method of notifying a first device 430 that a maximum input length threshold has been met on a second device 400 in accordance with one example. The input field type may include various attributes or values, including the maximum input length. The method can begin at block 310. At block 310 a first device 430 receives a text entry input or input indicating selection of a text field through the first device 430. The method 300 can then proceed to block 320 in which a signal corresponding to at least one selected character is sent from the first device 430 to a second device 400. The second device 400 monitors the text entered into text field and provides information to the first device 430 relating to input limitations of a text field. For example, a selected text field may be configured to receive only 15 characters. If the second device 400 receives a signal indicating that more than 15 characters are being attempted to be inputted into the text field, the second device 400 can notify the first device 430 that the maximum input threshold has been reached. Once notice of the threshold limit is received by the first device 430 at block 330, the method 300 can then proceed to block 340. At block 340, a display of the first device 430 can display a notice or warning that the maximum number of text characters has been entered.

Figure 4:
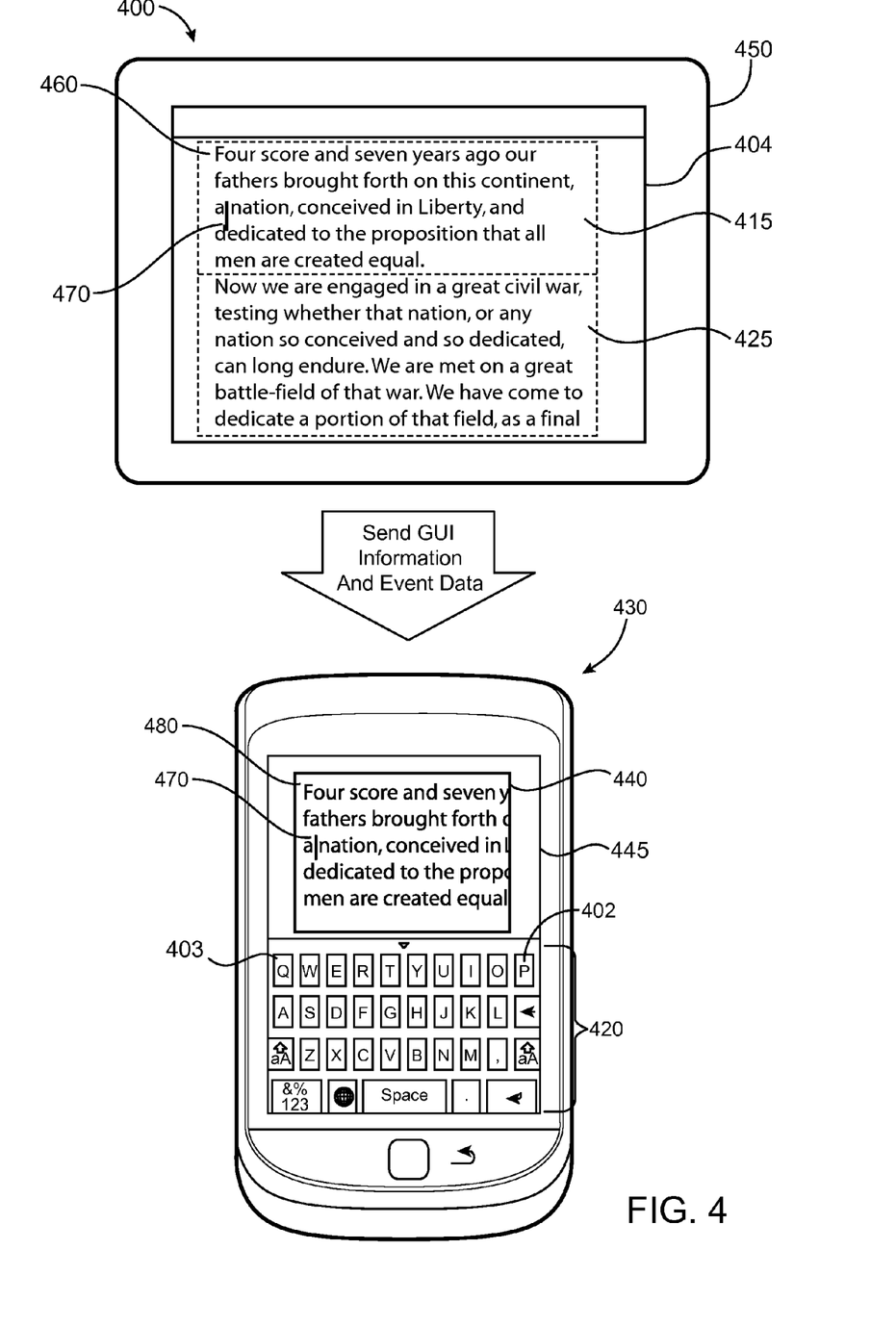
FIG. 4 is a visual representation of a word processing application according to one example.

FIG. 4 illustrates a first device 430 coupled to a second device 400. According to one example, a word processing application may be running on the second device 400 and the display 450 may be configured to present a plurality of text lines. Furthermore, the word processing application may be configured to define a separate text field for a predefined amount of text. For example, a text field may be defined by page, paragraph, sentence, word, character, or the like. In FIG. 4, the text fields are defined by paragraph and include text fields 415, 425.

According to one example, when a remote control application is launched on the first device 430 to control navigation on the second device 400, the operating system of the second device 400 generates operating system instructions that are transmitted to the first device 430. The processor at the first device 430 receives the operating system instructions, extracts event information, and configures the first device 430 to communicate with the active application on the second device 400. For example, the processor at the first device 430 launches a text entry keyboard in a data entry area 420 of display 445. The processor at the first device 430 also forwards focus event information, text field type event information, and cursor position event information to the remote control application.

FIG. 4 illustrates a display 445 of the first device 430 with text in a text display area 440 that corresponds to the text field 415. In one example, the text display area 440 is rendered adjacent to the data entry area 420. The data entry area 420 may include a virtual keyboard having a plurality of character keys (e.g., 402, 403) or a virtual keypad having a plurality of number keys (not shown). While the smaller display 445 size at the first device 430 is illustrated to display a portion of text corresponding to the text field 415, one of ordinary skill in the art will readily appreciate that the display format of the display 445 can be configured to display the entirety of the text within the text field 415.

According to one example, when the first device 430 operates as peripheral device to control data entry and navigation of the second device 450, actuating data entry keys and a navigation tool at the first device 430 can cause substantially simultaneous actions to be rendered on the display 450 of a second device 400 and the display 445 of the first device 430. In other words, the displays 445, 450 can be mirrored. Furthermore, the second device 400 can be configured to display a page view of the active application, while first device 430 can be configured to display a field view of the corresponding application.

Figure 5:
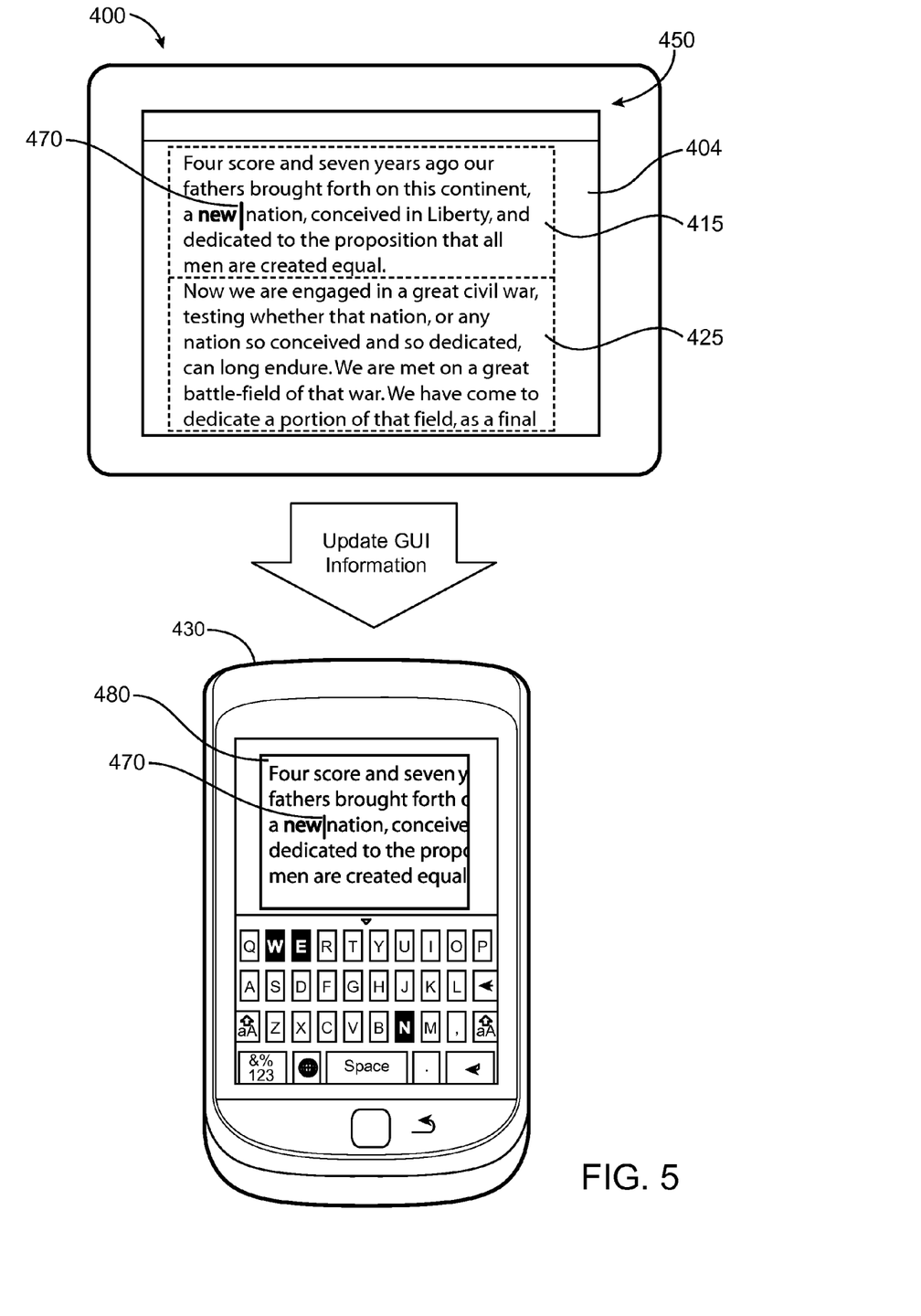
FIG. 5 is a visual representation of a word processing application according to another example.

FIG. 5 illustrates an example of displaying modified text and an updated cursor position on the first device 430 and the second device 400 in accordance with an example embodiment. The characters 'n', 'e', and 'w' are shown as having been actuated via the first device 430. The first device 430 processes text entry of the new characters, which are displayed to the left of the cursor 470, in a typical manner. The first device 430 is configured as a text entry peripheral device for the second device 400 and concurrently transmits text entry commands and navigation commands to the second device 400.

Figure 6:
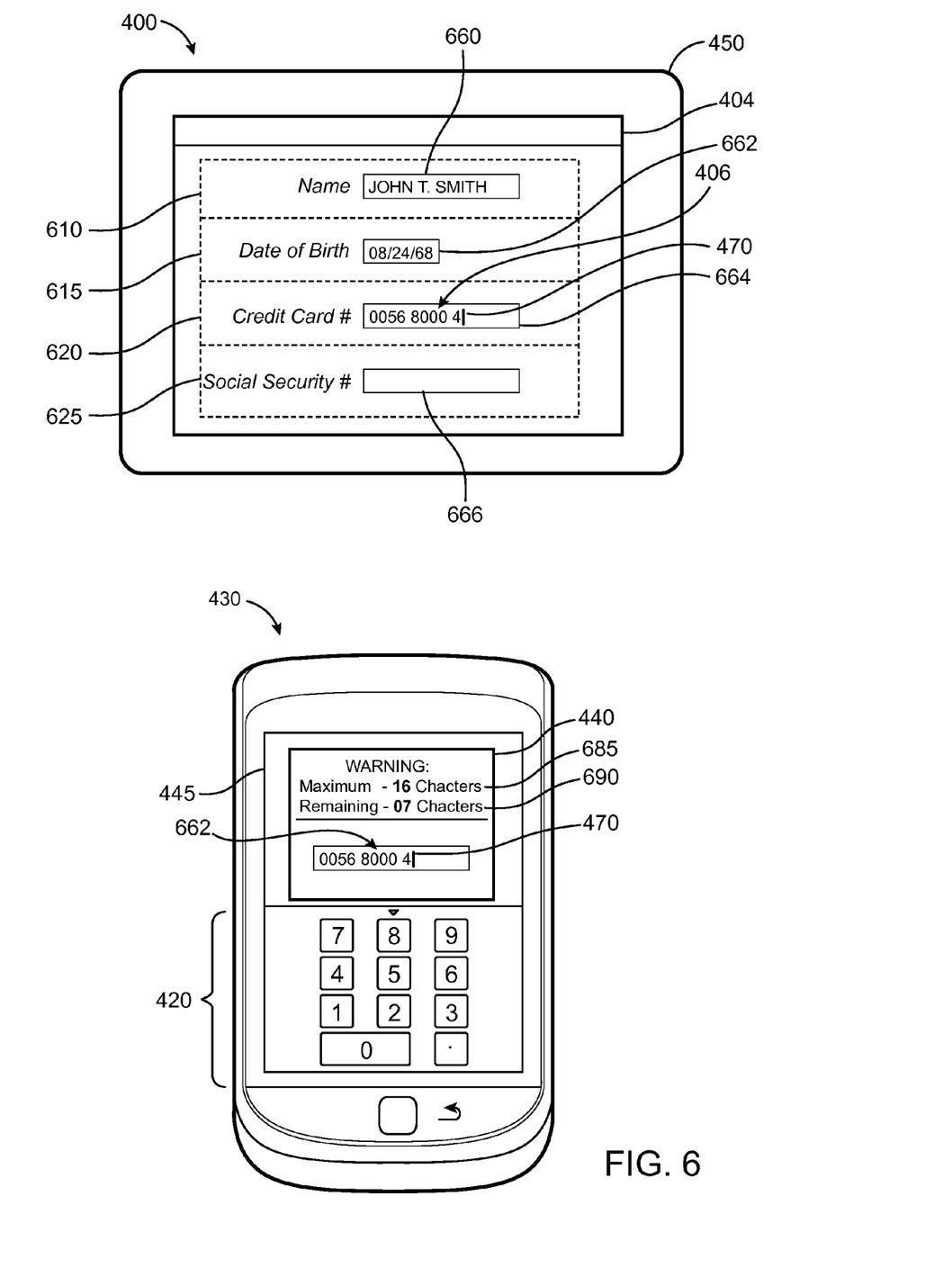
FIG. 6 is a visual representation of a data entry application according to one example.

According to another embodiment, FIG. 6 illustrates the display 450 of the second device 400 having a plurality of different fields, including a text field 610, a date field 615, and numeric fields 620, 625. In this example, the first device 430 is configured as a peripheral device that is manipulated to select numeric field 620. Upon selection of numeric field 620, the operating system of the second device 400 generates operating system instructions that are transmitted to the first device 430. The processor at the first device 430 receives the operating system instructions, extracts event information, and configures the first device 430 to communicate with the active application on the second device 400. For example, the processor at the first device 430 launches a numeric entry keypad in a data entry area 420 of display 445. The processor at the first device 430 also forwards focus event information, numeric field type event information, and cursor position event information to the remote control application. The numeric field type event information may include attributes such as maximum input length information, or the like.

According to one example, FIG. 6 illustrates that the numeric field 620 is focused at the second electronic device 400. This information is transmitted to the first electronic device 430 as focus event information and the display 445 is configured to display the corresponding credit card # block 664. In one example, the credit card # block 664 displayed at the first device 430 may be configured to also display a notification alerting a user that an input limit is imposed for the numeric field 620 associate with the credit card # block 664. The first device 430 can be used to enter numeric data for the credit card number in the credit card # block 664, which is displayed on both the display 445 of the first device 430 and the display 450 of the second device 400. The first device 400 may transmit information pertaining to the maximum number of characters that can be entered into the numeric field 620 to the second device 400 upon each actuation of keys on the number keypad. The first device 430 then displays information about that limit in the text display area 440 in substantially real-time. In the example illustrated, the displayed information can include the maximum number of characters message 685 and entered countdown 690.

In the example of credit card information entry, as described with respect to FIG. 6, the first device 430 can be configured to receive numeric field information such that non-numeric key-presses or character selections would be ignored. Another example of the use of field specific information would be that if an operator of the first device 430 clicked on (selected) a URL text field. In this case, only valid URL data entry keys would be processed by the second device 400. Alternatively, pressing enter (or return) could automatically clear entered data and the first device 430 would prompt the user to re-enter data. Attributes or values associated with the field information can also be used to automatically change the appearance of a virtual keyboard on the first device 430. As illustrated in the credit card # example, the virtual keyboard 420 could be configured to automatically display a numeric keypad instead of keyboard by default.

Figure 7:
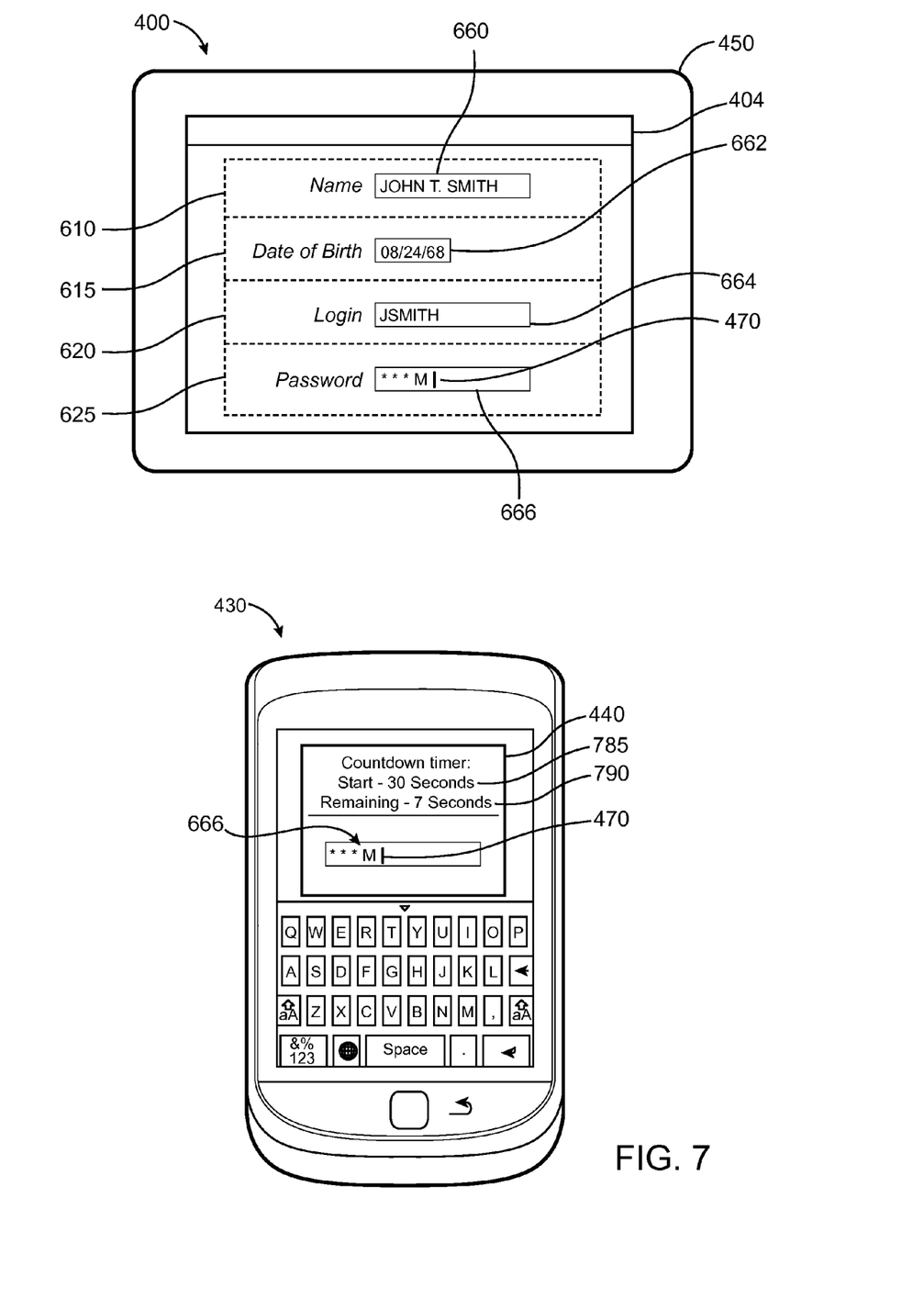
FIG. 7 is a visual representation of the data entry application according to one example.

As illustrated in FIG. 7, attributes associated with the field information also can be used to cause the first device 430 to display asterisks or other suitable characters in place of actuated characters or numbers when the selected field supports is to be used for entry of sensitive data such as, for example, a password. At least one field type can be dynamically updated. Furthermore, an attribute associated with a text field could identify the text field as a time-sensitive text field, such as for entry of a highly sensitive password. FIG. 7 illustrates displaying a time-sensitive notification on the first device 430 including an input countdown timer imposed for the password block 666. As illustrated, the first device 430 is used to enter data (a highly sensitive password) in the password block 666 at the second device 400. An attribute identifying a maximum amount of time allotted to enter characters into the password block 666 is transmitted from the second device 400 and displayed at the first device 430. The first device 430 then displays the countdown timer in the text display area 440. In the example illustrated, the counter timer information can include a start time 785 and a remaining time 790 that is decremented from the start countdown timer. The remaining countdown timer can also be incremented by a fixed number of seconds after each character entered in password block 666. If a countdown timer reaches zero time remaining, the data entered in the password block 666 can be deleted.

Figure 8:
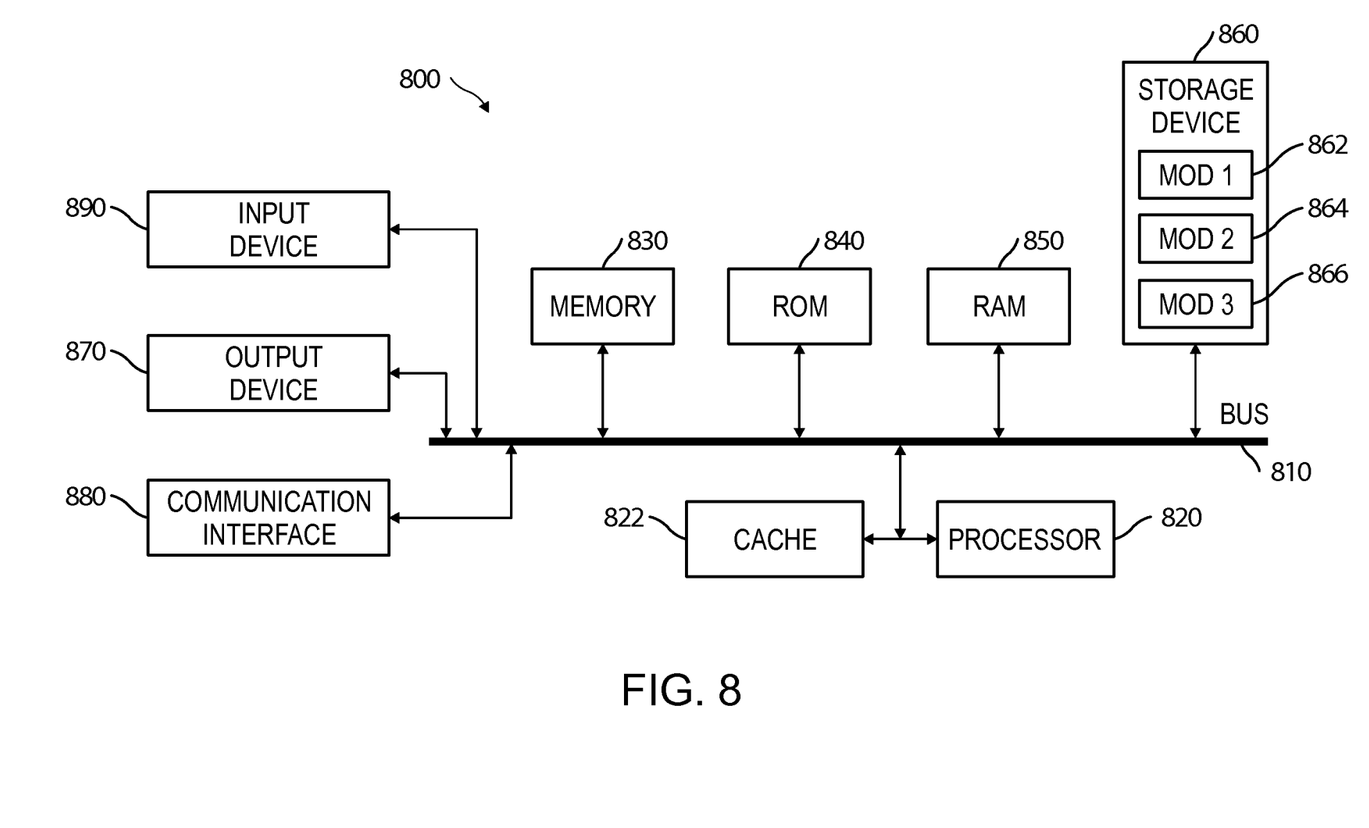
FIG. 8 illustrates a computing device system according to one example.

According to another embodiment, upon selection of a field type, the user may be presented with one or more data sources. For example, the text field 610 may include a name attribute and a plurality of data sources that store names. The plurality of data sources may include contacts data source, a recently dialed data source, a recently emailed data source, among other data sources. Entries corresponding to a selected data source may be presented to the user in various formats, including a drop-down menu, thumbnail view, or the like. Upon user selection of an entry, the name corresponding to the entry may be automatically entered into the name of block The disclosure now turns to a brief description of a computing device, as shown in FIG. 8, which can be employed to practice the concepts is disclosed herein. The components disclosed herein can be incorporated in whole or in part into tablet computers, personal computers, handsets, transmitters, servers, and any other electronic or other computing device.

With reference to FIG. 8, an example system 800 includes a general-purpose computing device 800, including a processing unit (CPU or processor) 820 and a system bus 810 that couples various system components including the system memory 830 such as read only memory (ROM) 840 and random access memory (RAM) 850 to the processor 820. The system 800 may be employed by the first device 430 and the second device 400. The system 800 can include a cache 822 of high speed memory connected directly with, in close proximity to, or integrated as part of the processor 820. The system 800 copies data from the memory 830 and/or the storage device 860 to the cache 822 for quick access by the processor 820. In this way, the cache provides a performance boost that avoids processor 820 delays while waiting for data. These and other modules can control or be configured to control the processor 820 to perform various actions. Other system memory 830 may be available for use as well. The memory 830 can include multiple different types of memory with different performance characteristics. It can be appreciated that the disclosure may operate on a computing device 800 with more than one processor 820 or on a group or cluster of computing devices networked together to provide greater processing capability. The processor 820 can include any general purpose processor and a hardware module or software module, such as module 1 862, module 2 864, and module 3 866 stored in storage device 860 and configured to control the processor 820 as well as a special-purpose processor where software instructions are incorporated into the actual processor design. The processor 820 may essentially be a completely self-contained computing system, containing multiple cores or processors, a bus, memory controller, cache, etc. A multi-core processor may be symmetric or asymmetric.

The system bus 810 may be any of several types of bus structures including a memory bus or memory controller, a peripheral bus, and a local bus using any of a variety of bus architectures. A basic input/output system (BIOS) stored in ROM 840 or the like, may provide the basic routine that helps to transfer information between elements within the computing device 800, such as during start-up. The computing device 800 further includes storage devices 860 such as a hard disk drive, a magnetic disk drive, an optical disk drive, tape drive or the like. The storage device 860 can include software modules 862, 864, 866 for controlling the processor 820. Other hardware or software modules are contemplated. The storage device 860 is connected to the system bus 810 by a drive interface. The drives and the associated computer readable storage media provide nonvolatile storage of computer readable instructions, data structures, program modules and other data for the computing device 800. In one aspect, a hardware module that performs a particular function includes the software component stored in a non-transitory computer-readable medium in connection with the necessary hardware components, such as the processor 820, bus 810, display 870, and so forth, to carry out the function. The basic components are known to those of skill in the art and appropriate variations are contemplated depending on the type of device, such as whether the device 800 is a small, handheld computing device, a desktop computer, or a computer server.

Although the example embodiment described herein employs a hard disk 860, it should be appreciated by those skilled in the art that other types of computer readable media storing data that are accessible by a computer may also be used in this example operating environment, such as magnetic cassettes, flash memory cards, digital versatile disks, cartridges, random access memories (RAMs) 850, read only memory (ROM) 840, a cable or wireless signal containing a bit stream and the like. Non-transitory computer-readable storage media expressly exclude media such as energy, carrier signals, electromagnetic waves, and signals per se.

To enable user interaction with the computing device 800, an input device 890 represents any number of input mechanisms, such as a microphone for speech, a touch-sensitive screen for gesture or graphical input, keyboard, mouse, motion input, speech and so forth. An output device 870 can also be one or more of a number of output mechanisms known to those of skill in the art. In some instances, multimodal systems enable a user to provide multiple types of input to communicate with the computing device 800. The communications interface 880 generally governs and manages the user input and system output. There is no restriction on operating on any particular hardware arrangement and therefore the basic features here may be substituted for improved hardware or firmware arrangements as they are developed.

For clarity of explanation, the embodiment of FIG. 8 is presented as including individual functional blocks including functional blocks labeled as a "processor" or processor 820. The functions these blocks represent may be provided through the use of either shared or dedicated hardware, including, but not limited to, hardware capable of executing software and hardware, such as a processor 820, that is purpose-built to operate as an equivalent to software executing on a general purpose processor. For example, the functions of one or more processors presented in FIG. 8 may be provided by a single shared processor or multiple processors. Use of the term "processor" should not be construed to refer exclusively to hardware capable of executing software. Illustrative embodiments may include a microprocessor and/or digital signal processor (DSP) hardware, read-only memory (ROM) 840 for storing software performing the operations discussed below, and random access memory (RAM) 850 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 800 shown in FIG. 8 can practice all or part of the recited methods, can be a part of the recited systems, and/or can operate according to instructions in the recited non-transitory computer-readable storage media. Such logical operations can be implemented as modules configured to control the processor 820 to perform particular functions according to the programming of the module. For example, FIG. 8 illustrates three modules Mod 1 862, Mod 2 864, and Mod 3 866, which are modules configured to control the processor 820. These modules may be stored on the storage device 860 and loaded into RAM 850 or memory 830 at runtime or may be stored as would be known in the art in other computer-readable memory locations.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply not only to a smart phone device but to other devices capable of receiving communications such as a laptop computer. Those skilled in the art will recognize modifications and changes that may be made using the principles described herein without departing from the scope of the disclosure or the following claims.

The invention claimed is:

1. A method comprising:
   receiving, at a first time, an input on a first device, the input selecting a field presented on the display of the first device and associated with a display of a second device;
   receiving, on the first device, context information transmitted from the second device for display on the first device in a focus field associated with the selected field;
   displaying, on the first device and at a second time that is later than the first time, the context information rendered for display on the first device in the focus field;
   receiving event information transmitted from the second device to the first device, wherein the event information is generated by the second device monitoring of input data associated with the selected field that is transmitted in substantially real time to the second device from the first device, wherein the event information also includes an input limitation associated with the selected field, and wherein data describing the input limitation of the selected field is displayed only on the first device in substantially real time; and
   applying, on the first device, the input limitation to additional input data associated with the selected field that is received on the first device.

2. The method of claim 1, wherein the field includes at least one of a text field, a numeric field, and a date field.

3. The method of claim 1, comprising receiving, on the first device, focus event and cursor position information from the second device.

4. The method of claim 1, comprising displaying graphical user interface information contained within the focus field.

5. The method of claim 4, comprising mirroring a location of a cursor in the focus field on the first device in the field.

6. The method of claim 1, comprising:
receiving operating system instructions from the second device;
extracting event information from the received operating system instructions; and
configuring, using at least the received operating system instructions, communication with an application on the second device.

7. The method of claim 1, further comprising:
displaying at least one selectable character on the display of the first device;
receiving at a third time, which is later than the first time and the second time, at least one input on the first device to select the at the least one selectable character; and
transmitting from the first device, the input received at the third time.

8. A non-transitory, computer-readable medium storing computer-readable instructions executable by a computer and configured to:
receive, at a first time, an input on a first device, the input selecting a field presented on the display of the first device and associated with a display of a second device;
receive, on the first device, context information transmitted from the second device for display on the first device in a focus field associated with the selected field;
display, on the first device and at a second time that is later than the first time, the context information rendered for display on the first device in the focus field;
receive event information transmitted from the second device to the first device, wherein the event information is generated by the second device monitoring of input data associated with the selected field that is transmitted in substantially real time to the second device from the first device, wherein the event information also includes an input limitation associated with the selected field, and wherein data describing the input limitation of the selected field is displayed only on the first device in substantially real time; and
apply, on the first device, the input limitation to additional input data associated with the selected field that is received on the first device.

9. The non-transitory, computer-readable medium of claim 8, wherein the field includes at least one of a text field, a numeric field, and a date field.

10. The non-transitory, computer-readable medium of claim 8, comprising instructions to receive, on the first device, focus event and cursor position information from the second device.

11. The non-transitory, computer-readable medium of claim 8, comprising instructions to display graphical user interface information contained within the focus field.

12. The non-transitory, computer-readable medium of claim 11, comprising instructions to mirror a location of a cursor in the focus field on the first device in the field.

13. The non-transitory, computer-readable medium of claim 8, comprising instructions to:
receive operating system instructions from the second device;
extract event information from the received operating system instructions; and
configure, using at least the received operating system instructions, communication with an application on the second device.

14. The non-transitory, computer-readable medium of claim 8, further comprising instructions to:
display at least one selectable character on the display of the first device;
receive at a third time, which is later than the first time and the second time, at least one input on the first device to select the at the least one selectable character; and
transmit from the first device, the input received at the third time.

15. A first device, comprising:
a processor and a non-transitory, computer-readable computer memory interoperably coupled to the processor and configured to:
receive, at a first time, an input on the first device, the input selecting a field presented on the display of the first device and associated with a display of a second device;
receive, on the first device, context information transmitted from the second device for display on the first device in a focus field associated with the selected field;
display, on the first device and at a second time that is later than the first time, the context information rendered for display on the first device in the focus field;
receive event information transmitted from the second device to the first device, wherein the event information is generated by the second device monitoring of input data associated with the selected field that is transmitted in substantially real time to the second device from the first device, wherein the event information also includes an input limitation associated with the selected field, and wherein data describing the input limitation of the selected field is displayed only on the first device in substantially real time; and
apply, on the first device, the input limitation to additional input data associated with the selected field that is received on the first device.

16. The first device of claim 15, wherein the field includes at least one of a text field, a numeric field, and a date field.

17. The first device of claim 15, configured to receive, on the first device, focus event and cursor position information from the second device.

18. The first device of claim 15, configured to display graphical user interface information contained within the focus field.

19. The first device of claim 18, configured to mirror a location of a cursor in the focus field on the first device in the field.

20. The first device of claim 15, configured to:
receive operating system instructions from the second device;
extract event information from the received operating system instructions; and
configure, using at least the received operating system instructions, communication with an application on the second device.

* * * * *